(12) United States Patent
Stacey

(10) Patent No.: US 7,941,094 B2
(45) Date of Patent: May 10, 2011

(54) APPARATUS AND METHOD OF WIRELESS COMMUNICATION AT A PLURALITY OF PERFORMANCE LEVELS

(75) Inventor: Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 647 days.

(21) Appl. No.: 10/863,091

(22) Filed: Jun. 8, 2004

(65) Prior Publication Data

US 2005/0272380 A1   Dec. 8, 2005

(51) Int. Cl.
  *H04B 7/00*   (2006.01)
(52) U.S. Cl. ....... 455/41.2; 455/41.3; 455/574; 370/311
(58) Field of Classification Search .............. 455/500, 455/522, 41.2, 41.3, 574, 550.1, 552.1, 343.2–343.6; 370/311
  See application file for complete search history.

(56) References Cited

U.S. PATENT DOCUMENTS

| | | | |
|---|---|---|---|
| 6,192,230 B1 * | 2/2001 | van Bokhorst et al. .... | 455/343.3 |
| 6,243,579 B1 | 6/2001 | Kari | |
| 6,480,476 B1 * | 11/2002 | Willars ......... | 370/311 |
| 2002/0132603 A1 * | 9/2002 | Lindskog et al. ............ | 455/343 |
| 2003/0156561 A1 * | 8/2003 | Padovani et al. ............ | 370/335 |
| 2003/0231597 A1 * | 12/2003 | Hester et al. ................. | 370/252 |
| 2003/0231608 A1 * | 12/2003 | Wentink ........ | 370/338 |
| 2004/0246934 A1 * | 12/2004 | Kim .............................. | 370/338 |
| 2005/0135305 A1 * | 6/2005 | Wentink ........ | 370/329 |
| 2005/0135318 A1 * | 6/2005 | Walton et al. ................ | 370/338 |
| 2005/0226183 A1 * | 10/2005 | Penumetsa .................... | 370/329 |

FOREIGN PATENT DOCUMENTS

WO   WO 03/069934 A   8/2003

OTHER PUBLICATIONS

Salkintzis, Performance Analysis of a Downlink MAC Protocol with Power-Saving Support, Transactions on Vehicular Technology, vol. 49, No. 3, IEEE pp. 1029-1040, XP-001072685.
PCT Search Report & Written Opinion, dated Aug. 29, 2005.

* cited by examiner

*Primary Examiner* — Edward Urban
*Assistant Examiner* — Fayyaz Alam
(74) *Attorney, Agent, or Firm* — Blakely, Sokoloff, Taylor & Zafman LLP

(57) ABSTRACT

An apparatus, comprising at least one wireless receiver, the at least one wireless receiver may be capable of operating at a plurality of performance levels, and the apparatus may be capable of communicating a performance level that the at least one wireless receiver is operating at to at least one wireless device in communication with the apparatus. The at least one wireless receiver may be capable of transitioning from a first performance level to a second performance level and further may be capable of communicating the transition to the second performance level that the at least one wireless receiver is operating at to at least one wireless device in communication with the apparatus. The first performance level may be an enhanced receive capability level and the second performance level may be a reduced receive capability level.

25 Claims, 2 Drawing Sheets

APPARATUS AND METHOD OF WIRELESS COMMUNICATION AT A PLURALITY OF PERFORMANCE LEVELS

BACKGROUND

In today's wireless environment numerous devices are present and may be connected wirelessly. Further, in today's wireless environment there are a large number of wireless devices that are mobile and therefore must operate on battery power. Also, there are a large number of devices that utilize different wireless technologies and standards to transmit and receive wireless information.

Thus, there is a continuing need for better ways for wireless devices to improve performance, longevity of operation and interoperability among differing wireless technologies.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

Figure 1:
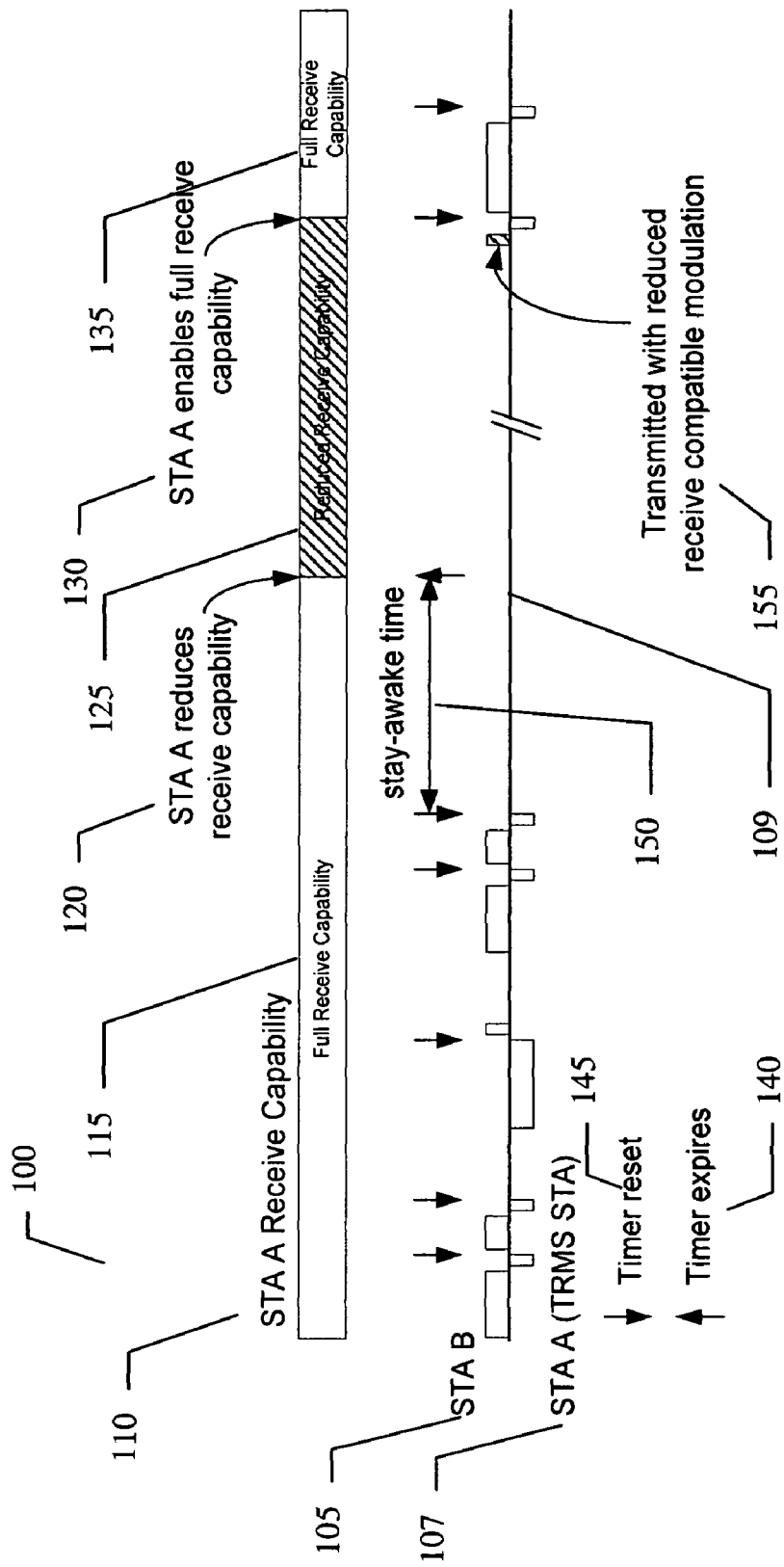
FIG. 1 is an illustration of a data transfer example with timed receive mode switching.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g. as in a cause an effect relationship).

It should be understood that embodiments of the present invention may be used in a variety of applications. Although the present invention is not limited in this respect, the devices disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's), notebook computers in wireless local area networks (WLAN) or wide area networks (WAN), or personal area networks (PAN, and the like).

With the phenomenal growth of wireless technologies in recent years we are seeing the ubiquitous introduction of devices such as laptops, PDAs and smart phones that contain have wide varieties of uses. Although the present invention is in no way limited to these devices. It may be important for such devices that may be powered by batteries (or any other mobile power source as the present invention is not limited to battery powered mobile devices) that they efficiently manage and conserve the power required to operate these wireless devices. Most of the time that a device is "wirelessly connected" to an access-point, base-station or peer wireless device, it may be to simply exchange control frames in order to maintain the connectivity between the wireless device and the base-station or peer wireless devices. Occasionally the device or the base station exchange data traffic for e-mail access, Internet access, voice-over-IP connection, etc. (although the present invention is not limited to these uses of wireless information transfer and indeed all uses contemplated for wireless information transfer now known or later developed are intended to be within the scope of the present invention). Wireless devices may easily support multiple radios, multiple input/outputs and wireless protocols and the present invention is intended to include, but not be limited to, radio protocols such as wireless local area network (WLAN), wide area network (WAN), or local area network (LAN) protocols such as the Industrial Electrical and Electronics Engineers (IEEE) 802.11a/b/g, 802.16 and 802.18 standards, Bluetooth™, infrared, etc. (Bluetooth is a registered trademark of the Bluetooth Special Interest Group). It should be understood that the scope of the present invention is not limited by the types of, the number of, or the frequency of the communication protocols articulated herein.

As wireless devices may include multiple input and multiple outputs (MIMO), they may conserve power by reducing the number of active receivers during periods of inactivity or low bandwidth requirements. Some reduced receive capability may be retained allowing the system to be woken to full receive capability with the reception of an appropriately modulated frame. Although the present invention is not limited to being "woken up" or if "woken up" not limited to be "woken up" by a modulated frame, as this is but one example of transitioning from one state to the another—as will be elaborated on below.

An embodiment of the present invention provides an apparatus, comprising at least one wireless receiver, the at least one wireless receiver may be capable of operating at a plurality of performance levels, and the apparatus may be capable of communicating a performance level that the at least one wireless receiver is operating at to at least one wireless device in communication with the apparatus. The at least one wireless receiver may be capable of transitioning from a first performance level to a second performance level and further may be capable of communicating the transition to the second performance level that the at least one wireless receiver is operating at to at least one wireless device in communication with the apparatus. Although, the present invention is not limited in this respect.

The first performance level may be an enhanced receive capability level and the second performance level may be a reduced receive capability level. It is anticipated that although a first and second performance level is used to illustrate one embodiment of the present invention, an infinite number of performance levels are intended to be within the scope of the present invention. Although the present invention is not limited in this respect, the apparatus may be a wireless station (STA) capable of operating in a wireless network and the transition from a first performance level to the second performance level may occur based on a timer in the STA that triggers the transition to reduced receive capability. However, the present invention is not limited to the use of a timer to trigger the reduced receive capability as other methods of determining when to transition may include, but are not limited to, a master controller, a packet throughput requirement, network organization requirements or the like.

The STA of the present invention may be capable of communicating with at least one access point (AP) or at least one other wireless station (also referred to herein as STA peers) in the wireless network, the at least one AP or at least one other wireless station may have a timer corresponding to the STA timer, thereby providing the capability to track the performance level of the STA. Although the present invention is not limited in this respect.

An embodiment of the present invention may provide that the at least one wireless receiver further comprise two or more receive chains and the at least one wireless receiver may be capable of operating at a plurality of performance levels by enabling or disabling the receive chains. The STA may return to a full receive capability after transmitting a frame and the AP or the at least one other wireless station may be aware of the full receive capability of the STA with the reception of the frame.

The timers in the STA, the at least one AP and the at least one other wireless station may be reset when a frame is transmitted by the STA.

The STA may be capable of a direct link protocol (DLP) session with the at least one other wireless station and to initiate the DLP session may include a Timed Receive Mode Switching (TRMS) information element (IE) in a DLP request frame. TRMS defined herein may be a protocol for managing transitions between reduced and full receive capability. The TRMS Information Element (IE) may be included in association and reassociation request frames, DLP request and response frames and TRMS Update action frames. This IE may include the following fields:

| Field | Description |
| --- | --- |
| TRMS active | Indicates whether or not TRMS operation is active |
| Stay-awake time | The amount of time in 100s of milliseconds that the STA operates with full receive capability after transmitting a frame. A value of zero may indicate that it retains full receive capability for 1 slot time (+SIFS) after transmitting a frame for which a response is expected. |
| Number of receive chains | The number of active receivers when operating with reduced receive capability. |

A stay-awake time of zero may indicate that the STA wishes to reduce receivers on completing a sequence exchange. In one embodiment of the present invention all APs, the STA and any peer STAs must support TRMS operation in other STAs with a stay-awake time of zero. A STA that supports TRMS operation in its DLP peers sets the TRMS Support bit in the DLP request or response frame.

An STA initiating a DLP session that wishes to operate using TRMS includes the TRMS IE in the DLP request frame. If the TRMS Support bit in the capability field in the DLP response indicates that the peer supports this, then the STA may operates using TRMS. Otherwise the STA may be required to operate with full receive capability for the duration of the DLP session.

To reiterate, an STA that receives a DLP request with the TRMS Support bit set and that wishes to operate using TRMS may include a TRMS IE in the DLP response and if the TRMS Support bit is not set in the request, then the STA may be required to operate with full receive capability or reject the request.

An STA responding to a DLP session setup that wishes to operate using TRMS responds to the received DLP request with a DLP response that includes the TRMS IE provided the DLP request has the TRMS Support bit set in its capability field. If the TRMS Support bit in the DLP request is not set then the STA may be required to operate with full receive capability and may not include the TRMS IE in the DLP response.

If a new DLP session results in the STA changing TRMS operating parameters, it may send a TRMS Update to the AP and its other DLP peers.

When associating with an AP, a STA that wishes to operate using TRMS may include the TRMS IE in an association or reassociation request. The TRMS Update Action frame may provide a mechanism for the STA to notify the AP and its peers of changes in its operating mode. This frame may include the TRMS IE defined above.

Further, the TRMS STA may have TRMS parameters (although they are not required for the present invention) and if the STA wishes to update the TRMS parameters under which it is operating after association, it may send a directed TRMS Update frame to the AP with new parameters. When doing this it sends a directed TRMS Update to the AP and each of its DLP peers. If an ACK is not received for the TRMS update after a number of retries, then the STA may disassociate in the case of the AP not responding or teardown the DLP session in the case of a STA not responding. The STA should send the updates before the new parameters take effect if the parameters decrease the stay-awake time or enable TRMS.

The STA may deactivate the TRMS operation at any time and may activate the TRMS operation with a zero stay-awake time at any time. The STA may only activate TRMS operation with a non-zero stay-awake time if the AP and all of the STA's DLP peers support this mode of operation.

The frames sent to the STA that may be operating with reduced receive capability may, in an embodiment of the present invention, be transmitted using modulation compatible with the STA's reduced receive capability. Although the present invention is not limited in this respect.

When operating in an Independent Basic Service Set (IBSS), the STA may advertise its capability to support TRMS to the at least one additional wireless station by setting a TRMS Support bit in a capability field of the STA's beacons. A STA may operate using TRMS if all the beacons it receives from other members of the IBSS have the TRMS Support bit set.

A STA that wishes to operate using TRMS sends a TRMS Update frame to each peer in the IBSS and then enables TRMS operation. Once enabled, the STA should include the TRMS IE in future beacons. As new STAs that support TRMS join the IBSS (which may discovered through the receipt of their beacons) the STA may send TRMS update frames to each.

If after enabling TRMS, the STA receives a beacon which does not have the TRMS Support bit set, then it may stop operating using TRMS and may send directed TRMS updates, with status inactive, to all peers in the IBSS. Future beacons may indicate the new status. Thus, in an embodiment of the present invention, the STA may operate using TRMS only if all beacons it receives from the at least one additional wireless devices within the IBSS has the TRMS Support bit set. Although the present invention is not limited in this respect. An STA that wishes to operate using TRMS may send a TRMS Update frame to each peer in the IBSS and then enable TRMS operation. If after enabling the TRMS, the STA receives a beacon which does not have the TRMS Support bit set, then it may stop operating using TRMS and may send directed TRMS updates, with status inactive, to all peers in the IBSS and future beacons may indicate the new status.

Turning now to FIG. 1, shown generally at 100, is an illustration of a data transfer example with timed receive mode switching. The STA 107 (labeled as STA A in FIG. 1) capability is shown at 110 starting at full receive capability 115. A STA 107 using TRMS maintains a running timer 109 that is reset each time a frame is transmitted. If the timer 109 reaches the stay-awake time 150 then the STA 107 switches at 120 to reduced receive operation 125 unless a frame is being received, in which case the switch will be delayed until immediately after the frame has been received. The STA 107 returns at 130 to full receive operation 135 after transmitting a frame.

An AP (or peer STA, used interchangeably herein) 105, labeled as STA B in FIG. 1. maintains a running timer 109 for each associated STA 107 that is operating using TRMS. The timer for a particular STA 107 is reset 145 each time a frame is received with the transmitter address (TA) of the TRMS STA (whether or not the frame is addressed to the AP). If the timer reaches the end 140 of the stay-awake time 150 then the TRMS STA 107 is assumed to have switched to reduced receive operation 125.

Frames sent to a TRMS STA 107 that is assumed to be operating with reduced receive capability are transmitted using modulation 155 compatible with the TRMS STA's 107 reduced receive capability.

Figure 2:
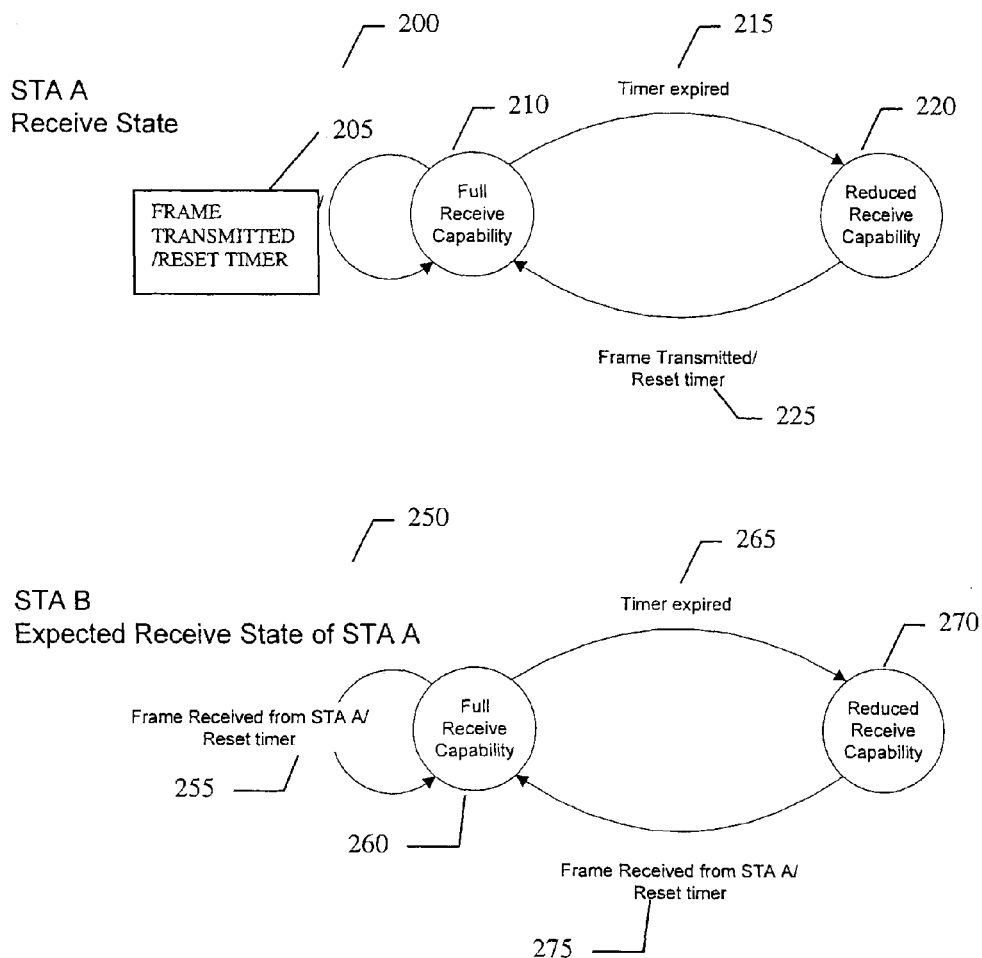
FIG. 2 is a state diagram of one embodiment of the present invention It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

Turning now to FIG. 2, shown generally at 200, is a state diagram of an embodiment of the present invention wherein the STA 107 is in a receive state. At 205 a frame is sent and the timer is reset and a full receive capability is enabled at 210. When timer expires at 215, the STA changes to a reduced receive capability at 220. When a frame is transmitted and timer is reset at 225, the STA returns to a full receive capability 210.

Shown generally at 250 is STA 105 in state where it expects STA 107 to be in full receive capability state 260 and where at 255 a frame is received from STA 107 and the timer is reset. At this time STA 107 continues to expect STA 105 to be in a full receive capability state 260. When the timer expires at 265 the STA 105 expects STA 107 to shift to a reduced receive capability at 270. After a frame is received from STA 107, the timer is reset at 275 and the STA 105 expects STA 107 to shift to a full receive capability.

Another embodiment of the present invention provides a method of operation of the present invention. The method may comprise operating at least one wireless receiver associated with a wireless device at a plurality of performance levels, and communicating a performance level of the wireless receiver to at least one other wireless device. The method may further comprise transitioning from a first performance level to a second performance level within the wireless receiver and communicating the transition to a second performance level to at the least one other wireless device.

The first performance level may be a reduced receive capability level and the second performance level may be an enhanced receive capability level. Although the present invention is not limited in this respect. The present method may further comprise transitioning from a first performance level to a second performance level based on a timer in the STA that triggers the transition to the reduced receive capability and communicating the STA with at least one access point (AP) and at least one other wireless station in the wireless network, the at least one AP and at least one other wireless station may have a timer corresponding to the STA timer, thereby providing the capability to track the performance level of the STA.

Although the present invention is not limited in this respect, the method of the present invention may further comprise resetting the timers in the STA, the at least one AP, and the at least one other wireless station, when a frame is transmitted by the STA. Also the method of the present invention may further comprise linking the STA, with a direct link protocol (DLP) session, with the at least one other wireless station, the DLP session including a Timed Receive Mode Switching (TRMS) information element (IE) in a DLP request frame. The method may further comprise setting a TRMS Support bit in a capability field of an AP beacon thereby indicating its support for TRMS operation in the at least one other wireless station and using an IE by the STA and the at least one other wireless station to associate or reassociate in the wireless network and when associating, a STA that wishes to operate using TRMS includes the TRMS IE in an association or reassociation request.

Another embodiment of the present invention provides an article comprising a storage medium having stored thereon instructions, that, when executed by a computing platform, results in operating at least one wireless receiver associated with a wireless device at a plurality of performance levels, transitioning from a first performance level to a second performance level within the wireless receiver, and communicating the performance level of the wireless receiver to at least one other wireless device. The first performance level may be a reduced receive capability level and the second performance level is an enhanced receive capability level.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A wireless station (STA) capable of operating in a wireless network and of communicating with an access point (AP) or another wireless station in the wireless network comprising:
a wireless receiver capable of operating at a plurality of different active receive performance levels, capable of transitioning from a first performance level to a second performance level by independently enabling and disabling one or more receive chains of the receiver, wherein the first performance level is an enhanced receive capability level and the second performance level is a reduced receive capability level, wherein the transition from a first performance level to a second performance level occurs based on a timer in the STA that triggers the transition to the reduced receive capability, and the wireless receiver capable of operating with a plurality of different stay awake times; and
a wireless transmitter to communicate a current one of the different active receive performance levels and a current one of the different stay awake times at which the wireless receiver is operating to a second STA in a request message for establishing a direct link protocol (DLP) communication session with the second STA, wherein the apparatus is capable of initiating the DLP session using a Timed Receive Mode Switching (TRMS) information element (IE) in a DLP request frame, the TRMS IE including a current one of the different active receive performance levels and a current one of the different stay awake times at which the wireless receiver is operating,
wherein the AP or the second STA has a timer corresponding to the STA timer and a reception capability for frames transmitted by the STA thereby providing the capability to track the performance level of the STA, and
wherein when operating in an Independent Basic Service Set (IBSS), the STA advertises its capability to support TRMS to the at least one additional wireless station by setting a TRMS Support bit in a capability field of the STA's beacons.

2. The apparatus of claim 1, wherein the transmitter communicates the transition to the second performance level at which the wireless receiver is operating to the wireless device in the communication session together with a current one of the different stay awake times to the other wireless device using a single IE (Information Element) in an update message.

3. The apparatus of claim 1, wherein the STA is capable of transitioning from the second performance level to the first performance level after transmitting a frame.

4. The apparatus of claim 1, wherein the timers in the STA, the AP or the other wireless station are reset when a frame is transmitted by the STA.

5. The apparatus of claim 1, wherein the AP indicates its support for TRMS operation in the other wireless station by setting a TRMS Support bit in a capability field of the AP's beacon.

6. The apparatus of claim 1, wherein the STA includes the TRMS IE in an association or reassociation request.

7. The apparatus of claim 6, wherein the TRMS has TRMS parameters and if the STA wishes to update the TRMS parameters under which it is operating after association, it sends a directed TRMS Update frame to the AP with new parameters.

8. The apparatus of claim 1, wherein the STA may deactivate the TRMS operation at any time.

9. The apparatus of claim 1, wherein the STA may activate the TRMS operation with a zero stay-awake time at any time.

10. The apparatus of claim 1, wherein the STA may only activate TRMS operation with a non-zero stay-awake time if the AP and all of the STA's DLP peers support this mode of operation.

11. The apparatus of claim 4, wherein frames sent to the STA that is operating with reduced receive capability are transmitted using modulation compatible with the STA's reduced receive capability.

12. The apparatus of claim 1, wherein the STA may operate using TRMS only if all beacons it receives from the additional wireless devices within the IBSS have the TRMS Support bit set.

13. The apparatus of claim 1, wherein a STA that wishes to operate using TRMS sends a TRMS Update frame to each peer to the IBSS and then enables TRMS operation.

14. The apparatus of claim 13, wherein, if after enabling the TRMS, the STA receives a beacon which does not have the TRMS Support bit set, then the STA stops operating using TRMS and sends directed TRMS updates, with status inactive, to all peers in the IBSS and sends any future beacons with status inactive.

15. The apparatus of claim 1, wherein the TRMS IE indicates one of a plurality of performance levels by indicating a number of enabled receive chains.

16. The apparatus of claim 1, wherein, the STA returns to a full receive capability after transmitting a frame and the AP or the other wireless station are aware of the full receive capability of the STA with the reception of the frame.

17. A method, comprising:
setting a TRMS (Timed Receive Mode Switching) Support bit in a capability field of an AP (Access Point) beacon thereby indicating the AP's support for TRMS operation in the other wireless station;

operating in an Independent Basic Service Set (IBSS) by a STA (Wireless Station) advertising its capability to support TRMS to an additional wireless station by setting a TRMS Support bit in a capability field of the STA's beacons;

operating a wireless receiver of the wireless station (STA) associated in a session with a wireless device at one of a plurality of different active receive performance levels and one of a plurality of different stay awake times;

wirelessly communicating a current one of the different active receive performance levels and a current one of the different stay awake times at which the wireless receiver is operating to a second STA in a request message for establishing a communication direct link protocol (DLP) session with the second STA, wherein wirelessly communicating comprises using an IE in a DLP request frame if the STA has initiated the session or a response frame if the other wireless station has initiated the session;

transitioning from a first performance level to a second performance level based on a timer in the STA that triggers the transition to the reduced receive capability;

communicating by the STA with an access point (AP) or another wireless station in the wireless network, the AP or other wireless stations having a timer corresponding to the STA timer thereby providing the capability to track the performance level of the STA; and resetting the timers in the STA, the AP, and the other wireless station, when a frame is transmitted by the STA.

18. The method of claim 17, further comprising transitioning from a first performance level to a second performance level within the wireless receiver and wirelessly communicating the transition together with a current one of the different stay awake times to the other wireless device using a single IE (Information Element) in an update message.

19. The method of claim 18, wherein wireless communicating further comprises communicating the transition to a second performance level to the other wireless device as a change in an IE (Information Element) of a beacon.

20. The method of claim 19, wherein the first performance level is an enhanced receive capability level and the second performance level is a reduced receive capability level distinguished by independently enabling and disabling receive chains of the receiver.

21. The method of claim 17, further comprising transitioning from the second performance level to the first performance level after transmitting a frame.

22. The method of claim 17, further comprising using an IE that communicates one of a plurality of different receive performance levels and one of a plurality of different stay awake times by the STA and the other wireless station in an associate or reassociate DLP request message in the wireless network.

23. The method of claim 22, further comprising sending, by the STA, a directed TRMS Update frame to the AP with a current one of the different active receive performance levels and a current one of the different stay awake times using a single information element (IE).

24. The method of claim 17, further comprising transmitting, for frames sent to the STA capable of the TRMS that is operating with reduced receive capability, using modulation compatible with the STA's with TRMS reduced receive capability.

25. The method of claim 17, further comprising returning to a full receive capability by the STA after transmitting a frame and the AP or the other wireless station being aware of the full receive capability of the STA.

* * * * *